(12) United States Patent
Yun et al.

(10) Patent No.: US 10,045,162 B2
(45) Date of Patent: Aug. 7, 2018

(54) DEVICE AND METHOD FOR TRANSMITTING AND RECEIVING MEDIA SERVICE IN HYBRID NETWORK

(71) Applicant: Electronics and Telecommunications Research Institute, Daejeon (KR)

(72) Inventors: Joungil Yun, Daejeon (KR); Woo-Suk Kim, Daejeon (KR); Byungjun Bae, Daejeon (KR); Hyun-Jeong Yim, Daejeon (KR); Hyoungsoo Lim, Daejeon (KR); Namho Hur, Sejong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 279 days.

(21) Appl. No.: 14/996,731

(22) Filed: Jan. 15, 2016

(65) Prior Publication Data
US 2016/0302214 A1    Oct. 13, 2016

(30) Foreign Application Priority Data
Apr. 8, 2015   (KR) .................. 10-2015-0049893

(51) Int. Cl.
 H04L 12/28   (2006.01)
 H04W 4/06   (2009.01)
 (Continued)

(52) U.S. Cl.
 CPC .......... *H04W 4/06* (2013.01); *H04L 65/4069* (2013.01); *H04L 67/02* (2013.01); *H04W 72/005* (2013.01)

(58) Field of Classification Search
 CPC ....................................... H04W 4/06
 (Continued)

(56) References Cited

U.S. PATENT DOCUMENTS

| 6,889,385 B1 * | 5/2005 | Rakib ............. G08B 13/19656 348/E7.069 |
| 2013/0081088 A1 * | 3/2013 | Hwang ............. H04N 21/2362 725/59 |

(Continued)

FOREIGN PATENT DOCUMENTS

| KR | 1020130032019 A | 4/2013 |
| KR | 1020140041256 A | 4/2014 |

*Primary Examiner* — Dang Ton
(74) *Attorney, Agent, or Firm* — William Park & Associates Ltd.

(57) ABSTRACT

A device for transmitting a media service in a hybrid network, which is a combination of a broadcasting network and a communication network, includes a streaming server, a streaming client, a multiplexer, and a transmitter. The streaming server generates media segments including media data and a metadata file including temporal order information and downloading and reproduction information of the media segments corresponding to a plurality of profiles. The streaming client selects a profile according to a transmission bit ratio appropriate for a broadcasting resource allocation state, requests a media segment with quality that is suitable for the broadcasting resource allocation state from the streaming server, and downloads the same. The multiplexer multiplexes part of information of the metadata file on the profile selected from among the media segment and the metadata file of the plurality of profiles to generate a baseband frame. The transmitter converts the baseband frame into a broadcasting signal and transmits the same through a broadcasting network.

15 Claims, 4 Drawing Sheets

(51) Int. Cl.
*H04L 29/06* (2006.01)
*H04W 72/00* (2009.01)
*H04L 29/08* (2006.01)

(58) Field of Classification Search
USPC .......................................................... 370/329
See application file for complete search history.

(56) References Cited

U.S. PATENT DOCUMENTS

2013/0124683 A1   5/2013  Watanabe et al.
2013/0159546 A1*  6/2013  Thang ................. H04L 65/4084
                                                             709/231
2013/0271657 A1* 10/2013  Park ........................ H04N 9/44
                                                             348/525
2014/0130114 A1   5/2014  Hwang et al.

\* cited by examiner

DEVICE AND METHOD FOR TRANSMITTING AND RECEIVING MEDIA SERVICE IN HYBRID NETWORK

CROSS-REFERENCE TO RELATED APPLICATION

This application claims priority to and the benefit of Korean Patent Application No. 10-2015-0049893 filed in the Korean Intellectual Property Office on Apr. 8, 2015, the entire contents of which are incorporated herein by reference.

BACKGROUND OF THE INVENTION (a) Field of the Invention

The present invention relates to a method and device for transmitting/receiving a media service in a hybrid network. More particularly, the present invention relates to a technique for transmitting/receiving a media service in consideration of switching of a transmission path, a dynamically changing broadcasting network, and a state of a communication network.

(b) Description of the Related Art

Next-generation broadcasting standards such as Advanced Television Systems Committee (ATSC) 3.0 and Digital Video Broadcasting-Terrestrial 2 (DVB-T2) support IP-based multimedia streaming as well as conventional MPEG-2 TS-based multimedia streaming. This explicitly or implicitly aims at configuring a hybrid network that is a combination of a broadcasting network and a communication network and providing a multimedia streaming service, and it is one of important technical objects for the next generation broadcasting system to select a transmission path optimized to a transmission side or a receiving side and switch the transmission network regarding the hybrid network.

Another major characteristic of the next generation broadcasting system allows a plurality of media streams having a variable transmission bit ratio to be dynamically and flexibly allocated to a transmission frame and then be transmitted, differing from the conventional broadcasting system that transmits a fixed number of media streams according to a fixed transmission bit ratio. The above-noted characteristic represented by a concept such as the physical layer pipe (PLP) of the DVB-T2 allows to configure a plurality of logical channels with different modulation methods, different error correction code rates, and different transmission bit ratios in a single broadcasting channel, and dynamically allocate resources among the logical channels so that the broadcasting channel may be flexibly configured to satisfy the transmission bit ratio and the error correction code rate required for transmission, receiving, or services.

To provide the media service with optimal quality on the hybrid network, an optimized transmission path must be selected in consideration of a transmission resource status of the dynamically changing broadcasting network and communication network, and continuity of media data must be maintained when the transmission path is changed or the transmission bit ratio is adjusted. Further, to maintain continuity of media data between the broadcasting network and the communication network, an uncomplicated method for synchronizing media data is needed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a device and method for transmitting/receiving a media service in a hybrid network, which is a combination of a broadcasting network and a communication network, for providing a media service with optimal quality.

An exemplary embodiment of the present invention provides a device for transmitting a media service in a hybrid network, which is a combination of a broadcasting network and a communication network. The device for transmitting a media service includes a streaming server, a streaming client, a multiplexer, and a transmitter. The streaming server generates media segments including media data and a metadata file including temporal order information and downloading and reproduction information of the media segments corresponding to a plurality of profiles. The streaming client selects a profile according to a transmission bit ratio appropriate for a broadcasting resource allocation state, requests a media segment with quality that is suitable for the broadcasting resource allocation state from the streaming server, and downloads the same. The multiplexer multiplexes part of information of the metadata file on the profile selected from among the media segment and the metadata file of the plurality of profiles to generate a baseband frame. The transmitter converts the baseband frame into a broadcasting signal and transmits the same through a broadcasting network.

The multiplexer may monitor the broadcasting resource allocation state and may determine quality and a transmission bit ratio appropriate for the broadcasting resource allocation state.

The streaming server may stream the media segment and the metadata file through the communication network according to a request by a device for receiving a media service.

The multiplexer may multiplex dynamic broadcasting scheduling information from a server of a broadcasting station company to generate the baseband frame.

Another embodiment of the present invention provides a device for receiving a media service in a hybrid network that is a combination of a broadcasting network and a communication network. The device for receiving a media service includes a receiving processor, a demultiplexer, a streaming client, a synchronizer, and a reproducer. The receiving processor receives a broadcasting signal through a broadcasting network and extracts a baseband frame from the broadcasting signal. The demultiplexer separates a media segment and part of information of a metadata file by demultiplexing the baseband frame. The streaming client accesses a streaming server through the communication network, requests the metadata file and the media segment from the streaming server, and downloads the same from the streaming server when the communication network is determined for the transmission network of the media service. The synchronizer reconfigures the media segments that are received through the broadcasting network and the communication network according to a time order based upon a metadata file caused by the selected profile. The reproducer reproduces the reconfigured media segments.

The device for receiving a media service may further include a network switching controller for determining the transmission network according to a broadcasting receiving state, wherein the receiving processor may estimate the broadcasting receiving state from the broadcasting signal.

The device for receiving a media service may further include a network switching controller for determining the transmission network according to dynamic broadcasting scheduling information from a server of a broadcasting station company, wherein the receiving processor receives the dynamic broadcasting scheduling information through the broadcasting signal.

The streaming client may monitor a state of the communication network, may select a media segment and a profile with quality that is appropriate for the state of the communication network, and may request a metadata file of the selected media segment and the selected profile with the quality from the streaming server.

The device for receiving a media service may further include a file cache for storing media segments received through the broadcasting network and the communication network.

Yet another embodiment of the present invention provides a method for transmitting a media service by a device for transmitting a media service of a hybrid network combined with a broadcasting network and a communication network. The method for transmitting a media service includes: allowing a streaming server to generate media segments including media data and a metadata file including temporal order information and downloading and reproduction information of the media segments corresponding to a plurality of profiles; allowing a broadcasting receiving controller to select a metadata file on a profile that is appropriate for a transmission bit ratio suitable for a broadcasting resource allocation state; allowing the broadcasting receiving controller to request a media segment with quality that is appropriate for the broadcasting resource allocation state from the streaming server, and download the same; converting the media segment and part of information of the metadata file on the profile into a broadcasting signal, and transmitting the same through a broadcasting network; and allowing the streaming server to stream the media segment and the metadata file through the communication network according to a request by a device for receiving a media service.

The selection may include: monitoring the broadcasting resource allocation state; and determining quality and a transmission bit ratio appropriate for the broadcasting resource allocation state.

The method for transmitting a media service may further include transmitting dynamic broadcasting scheduling information from a server of a broadcasting station company through the broadcasting network.

The part of information may include information for decoding and reproducing the media segment.

Yet another embodiment of the present invention provides a method for a device for receiving a media service of a hybrid network combined with a broadcasting network and a communication network to receive a media service. The method for a device for receiving a media service includes: separating a media segment and part of information of a metadata file from a broadcasting signal received through a broadcasting network; determining a transmission network of the media service; when the communication network is determined for the transmission network, receiving the metadata file and the media segment from a streaming server through the communication network; reconfiguring the media segments received through the broadcasting network and the communication network according to a time order based upon the metadata file; and reproducing the reconfigured media segments.

The determination may include: monitoring a broadcasting receiving state from the broadcasting signal; and determining the transmission network as the broadcasting network or the communication network based upon the broadcasting receiving state.

The receiving may include: monitoring a state of the communication network; selecting a media segment with quality that is appropriate for the state of the communication network and a profile of the media service; and requesting the selected media segment with quality and the selected metadata file of the profile from the streaming server, and receiving the same from the streaming server.

The determining may include: receiving dynamic broadcasting scheduling information from a server of a broadcasting station company; and determining the transmission network as the broadcasting network or the communication network based upon the dynamic broadcasting scheduling information.

The reproduction may include reproducing the reconfigured media segments based upon the part of information and the metadata file.

DETAILED DESCRIPTION OF THE EMBODIMENTS

Figure 1:
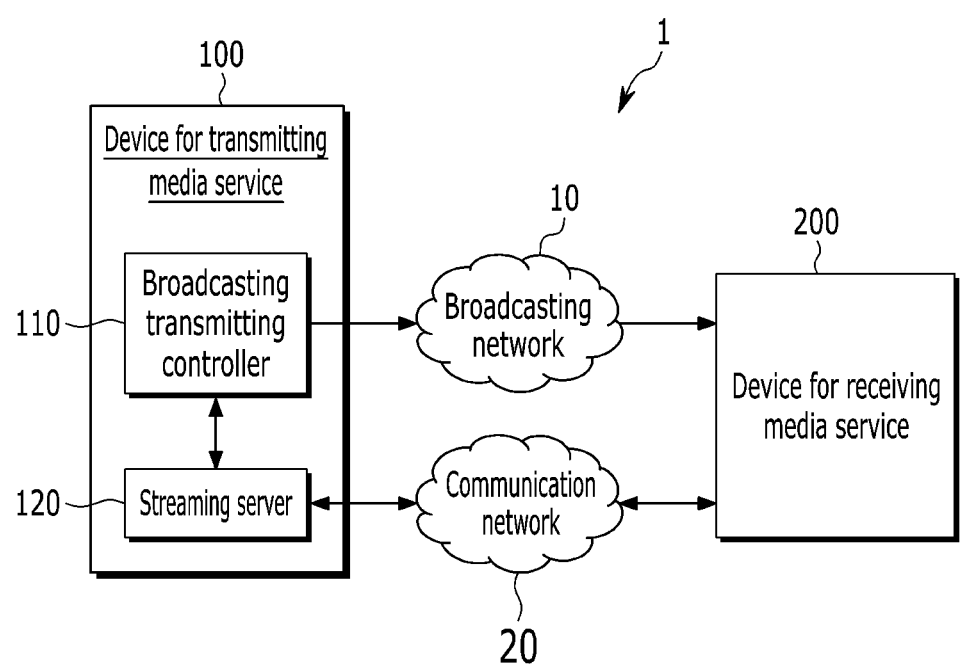
FIG. 1 shows a device for transmitting/receiving a media service in a hybrid network according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising" will be understood to imply the inclusion of stated elements but not the exclusion of any other elements.

A method and device for transmitting/receiving a media service in a hybrid network according to an exemplary embodiment of the present invention will now be described with reference to accompanying drawings.

FIG. 1 shows a device for transmitting/receiving a media service in a hybrid network according to an exemplary embodiment of the present invention.

Referring to FIG. 1, the hybrid network of the broadcasting system 1 signifies a network that is a combination of a broadcasting network 10 and at least one network that is different from the broadcasting network 10, for example, a communication network 20.

The broadcasting system 1 includes a device 100 for transmitting a media service and a device 200 for receiving a media service.

The device 100 for transmitting a media service includes a broadcasting transmitting controller 110 and a streaming server 120.

The broadcasting transmitting controller 110 transmits media data to the device 200 for receiving a media service through the broadcasting network 10.

The streaming server 120 transmits media data to the device 200 for receiving a media service through the communication network 20. The streaming server 120 transmits media data to the device 200 for receiving a media service according to a hypertext transfer protocol (HTTP)-based streaming method. The HTTP-based streaming may use a segment-transmission-based streaming method such as HTTP live streaming (HLS) or dynamic adaptive streaming over HTTP (DASH).

The segment-based streaming method such as HLS or DASH performs an access to media data for each unit called a segment. The segment is generally configured to be a data set including a plurality of independently reproducible data, it is stored in a file or data object format, and it can be accessed through a URI or URL. For example, in the case of a video stream, the segment may mean a group of pictures (GoP) unit. The segment is transmitted through an HTTP protocol and is transmitted according to a pull method that begins transmission by a user's request. The segment-based streaming service is defined as a file for describing an access address of segments carrying media data, temporal relationships of the segments, and meta-information (e.g., codec, resolution, or bit ratio) on media reproduction, and the receiving device initially analyzes the file and then provides a streaming service to a user. The file is a media presentation description (MPD) in the case of DASH, and it is m3u8 in the case of HLS.

Features of the segment-based media streaming include the media stream being configured by the segment that may be independently reproduced and a temporal order among the segments and an identifier (i.e., access address) for accessing the segment being explicitly defined, so when a transmission path is changed and a media stream is switched, guaranteeing continuity of the media stream is easier than in the streaming technique configured by the existing packet as a default unit. The features ease switching of segments that have a same time content in media contents but have different quality and a different transmission bit ratio so that the media stream that adaptively has optimal quality may be transmitted to the user corresponding to a transmission resource status of a dynamically changing transmission network. For ease of description, the DASH will be exemplified for the HTTP-based streaming method.

The streaming server 120 generates a media segment that is a segmented media data file for a DASH streaming service and an MPD file for a plurality of profiles. The MPD file provides a download of a corresponding media segment, time order information, and reproduction information.

The streaming server 120 provides an HTTP server function and transmits a media segment and/or an MPD file requested by a streaming client through an HTTP protocol. The streaming server 120 real-time generates a media segment with a reproduction time length (in general, an internal time of one second) appropriate for a live streaming for broadcasting, but an additional output interface for broadcasting is not required.

Figure 2:
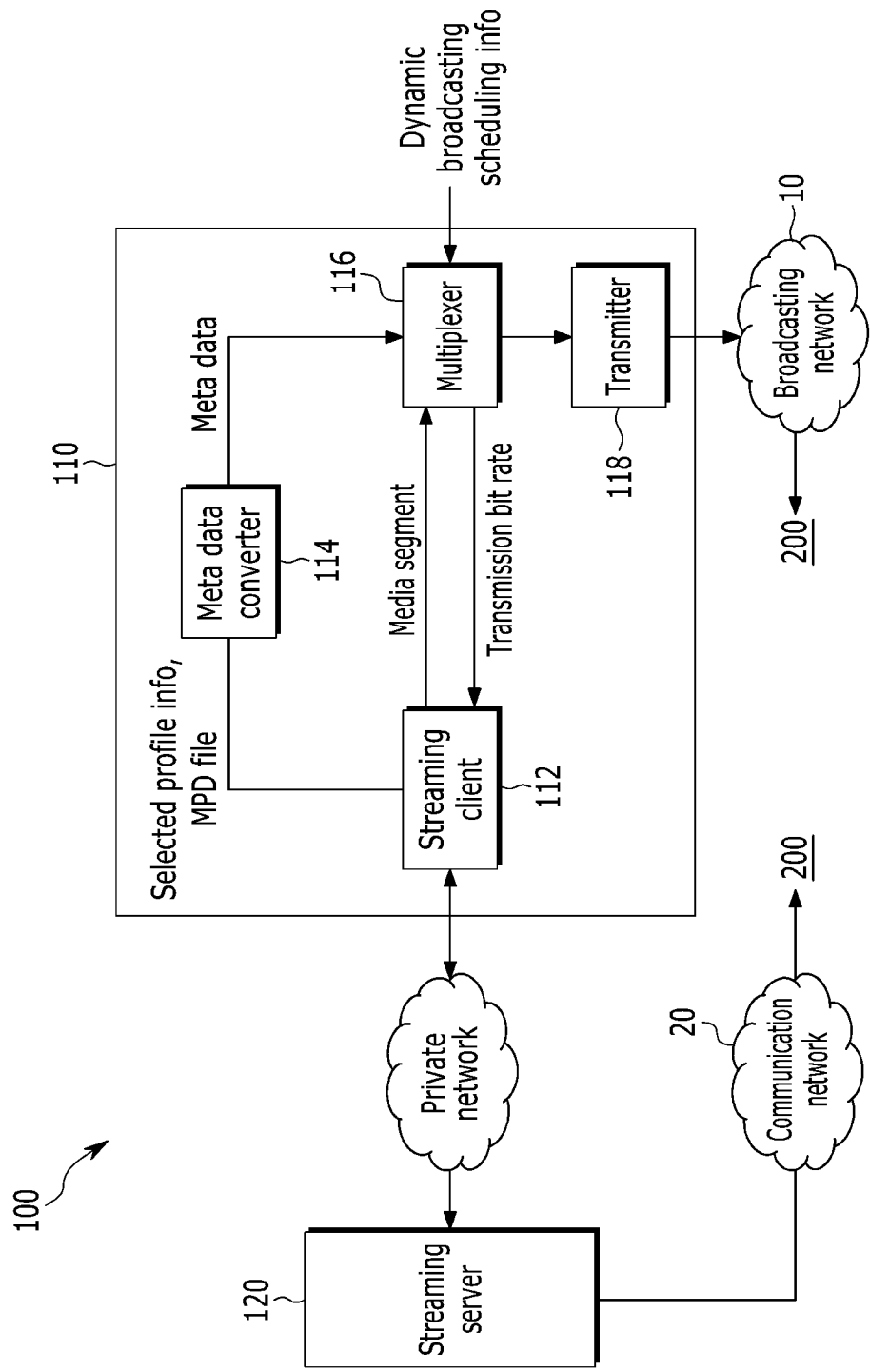
FIG. 2 shows a device for transmitting a media service shown in FIG. 1.

FIG. 2 shows a device for transmitting a media service shown in FIG. 1.

Referring to FIG. 2, the broadcasting receiving controller 110 of the device 100 for transmitting a media service includes a streaming client 112, a metadata converter 114, a multiplexer 116, and a transmitter 118.

The streaming client 112 requests a segment with appropriate quality and a transmission bit ratio from the streaming server 120 with reference to a broadcasting transmitting resource that may be presently allocated based upon a monitoring result of a broadcasting resource allocation state of the multiplexer 116. Here, the transmission bit ratio may be determined by quality. That is, the streaming client 112 selects a profile that is appropriate for a transmission bit ratio caused by a broadcasting resource allocation state from the MPD file on a plurality of profiles provided by the streaming server 120, requests a media segment of a next order maintaining continuity from the streaming server 120, downloads the same, and transmits the downloaded media segment to the multiplexer 116. The streaming client 112 transmits the MPD file caused by the selected profile and information on the selected profile to the metadata converter 114.

According to an exemplary embodiment of the present invention, the broadcasting receiving controller 110 of the device 100 for transmitting a media service also performs the function of the streaming client 112.

The streaming client 112 is connected to the streaming server 120 through a QoS guaranteed network so the streaming client 112 may download the requested files from the streaming server 120 in the optimal state without traffic. As described, since the streaming client 112 is connected to the streaming server 120 through a QoS guaranteed network, a network state between the streaming client 112 and the streaming server 120 is not monitored, differing from the streaming client (250 of FIG. 3) of the device 200 for receiving a media service.

The metadata converter 114 determines metadata on the media segment transmitted through the broadcasting network 10 from the MPD file and information on the selected profile, and transmits the metadata to the multiplexer 116. For example, the metadata may include information for decoding a media segment transmitted through the broadcasting network 10 and reproducing the same, and URI information for consecutively receiving media segments through the communication network 20 when the broadcasting receiving state of the broadcasting network 10 is not good.

The multiplexer 116 monitors the resource allocation state of the broadcasting network 10 such as a case when a transmission bandwidth of the broadcasting network is variable or when a bit ratio if input media data is changeable, and it then determines the transmission bit ratio appropriate for the broadcasting resource allocation state. The multiplexer 116 transmits the transmission bit ratio caused by the broadcasting resource allocation state to the streaming client 112.

The multiplexer 116 multiplexes the media segments received from the streaming client 112 with reference to the metadata determined by the metadata converter 114 to generate a baseband frame, generates signaling information including information on metadata and broadcasting, and transmits the baseband frame and the signaling information to the transmitter 118. In this instance, the baseband frame may be transmitted to the transmitter 118 by using an IP-based file delivery over unidirectional transport (FLUTE) protocol. The multiplexer 116 may also receive dynamic broadcasting scheduling information and may transmit the same to the transmitter 118. The dynamic broadcasting scheduling information may include a transmission path for a server of a broadcasting station to provide a specific service and information on scheduling a transmission method.

The transmitter 118 configures a transmission frame from the baseband frame, the signaling information, and the dynamic broadcasting scheduling information, modulates the transmission frame into a broadcasting signal, and transmits the broadcasting signal to the broadcasting network 10. The transmitter 118 may transmit signaling information and/or dynamic broadcasting scheduling information as a file or may transmit the same as a signaling table such as a service map table (SMT).

The multiplexer 116 may perform a multiplexing process to include at least one of the media segment, the metadata for signaling, and the media segment, and may generate a baseband frame, and the transmitter 118 may configure a transmission frame from the baseband frame.

The streaming server 120 of the device 100 for transmitting a media service streams the media segments through the communication network 20 according to the DASH method. The DASH-based streaming scheme by the streaming server 120 is well known to a person skilled in the art so no detailed description will be provided.

Figure 3:
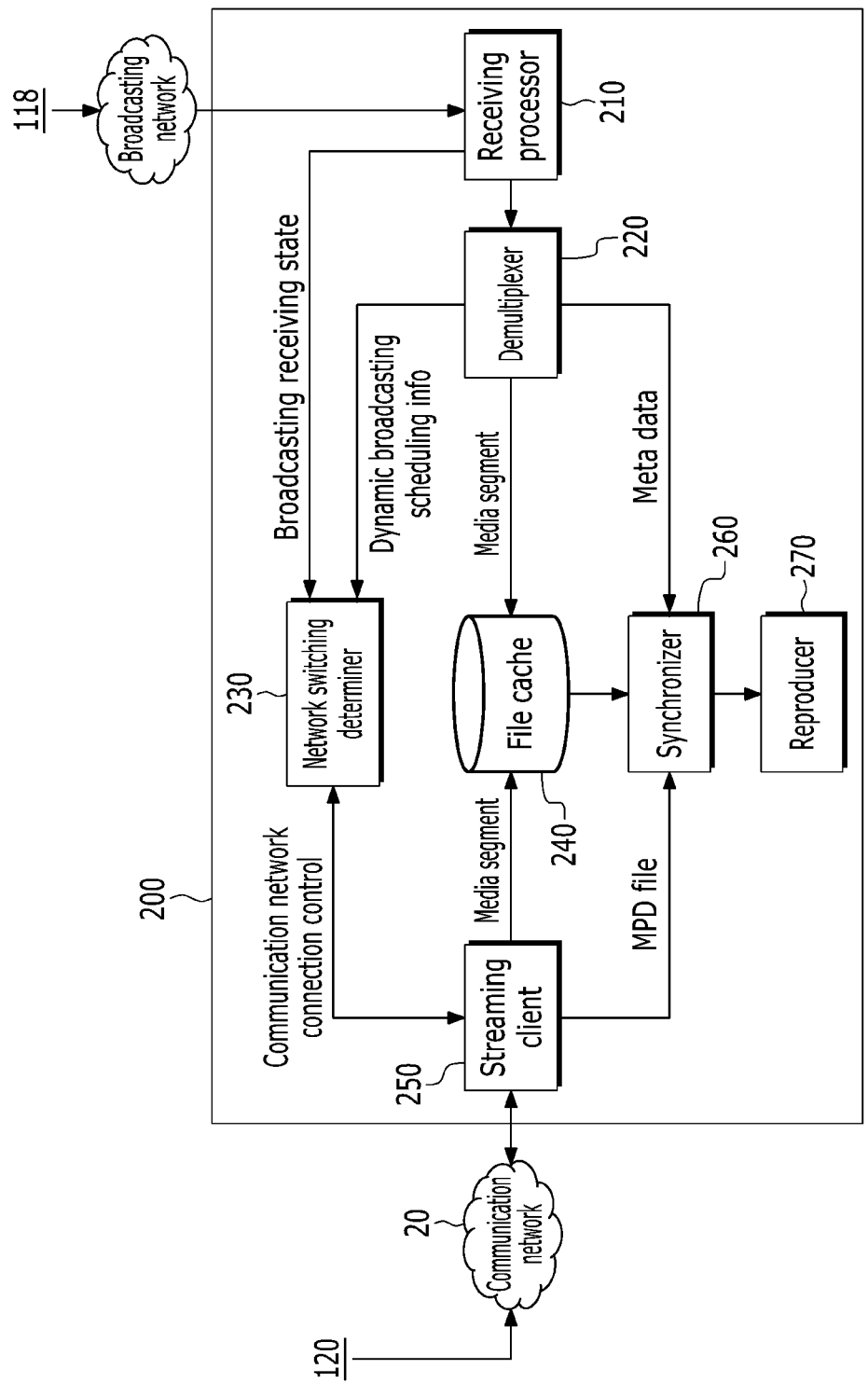
FIG. 3 shows a device for receiving a media service shown in FIG. 1.

FIG. 3 shows a device for receiving a media service shown in FIG. 1.

Referring to FIG. 3, the device 200 for receiving a media service includes a receiving processor 210, a demultiplexer 220, a network switching controller 230, a file cache 240, a streaming client 250, a synchronizer 260, and a reproducer 270.

The receiving processor 210 receives the broadcasting signal through the broadcasting network 10 and decodes the broadcasting signal to acquire a signal transmission frame, and the receiving processor 210 extracts the baseband frame, the signaling information, and the dynamic broadcasting scheduling information from the transmission frame. The baseband frame, the signaling information, and the dynamic broadcasting scheduling information are transmitted to the demultiplexer 220. The receiving processor 210 estimates the broadcasting receiving state of the broadcasting network 10 from the broadcasting signal, and transmits the broadcasting receiving state to the network switching controller 230.

The demultiplexer 220 demultiplexes the baseband frame to extract media segments, and transmits the media segments to the file cache 240. The demultiplexer 220 transmits the dynamic broadcasting scheduling information to the network switching controller 230, extracts metadata from the signaling information, and transmits the metadata to the synchronizer 260.

When the broadcasting receiving controller 110 of the device 100 for transmitting a media service multiplexes the media segment, the metadata for signaling, and the media segment to generate a baseband frame, the demultiplexer 220 demultiplexes the baseband frame into a media segment, metadata for signaling, and a media segment.

The network switching controller 230 determines whether to switch the transmission network according to the broadcasting receiving state or dynamic broadcasting scheduling information, and selects the service receiving path according to the determined transmission network. The network switching controller 230 may determine switching to the communication network 20 from the broadcasting network 10 or switching to the broadcasting network 10 from the communication network 20 according to the broadcasting receiving state or dynamic broadcasting scheduling information. When it is determined to switch to the communication network 20 from the broadcasting network 10, the network switching controller 230 may select the communication network 20 for the service receiving path. When it is determined to switch to the broadcasting network 10 from the communication network 20, the network switching controller 230 may select the broadcasting network 10 for the service receiving path. When the communication network 20 is selected for the service receiving path, the network switching controller 230 transmits a communication network connection control signal to the streaming client 250.

The file cache 240 stores media segments that are transmitted through the broadcasting network 10 and the communication network 20.

The streaming client 250 is connected to the streaming server 120 through the communication network 20 according to the communication network connection control signal from the network switching controller 230. In general, the communication network 20 between the streaming client 250 of the device 200 for receiving a media service and the streaming server 120 may use a QoS-not-guaranteed best effort network such as the Internet. Therefore, the streaming client 250 monitors the state of the communication network 20, and adaptively selects quality of media data according to the state of the communication network 20 to receive the media segment for a consecutive DASH streaming service and the MPD file. That is, the streaming client 112 of the device 100 for transmitting a media service selects a profile of media according to the broadcasting resource allocation state monitored by the multiplexer 116, and the streaming client 250 of the device 200 for receiving a media service monitors the state of the communication network 20 and selects a profile of media. The streaming client 250 receives a media segment according to the MPD file and the selected profile, stores the media segment in the file cache 240, and transmits the MPD file to the synchronizer 260.

The synchronizer 260 reconfigures the media segments and outputs them to the reproducer 270 so that they may be synchronized based on time order information of the media segments received through the broadcasting network 10 and the communication network 20 and stored in the file cache 240, and they may have temporal continuity.

The reproducer 270 decodes the input consecutive media segments according to reproduction information provided through the metadata for signaling of the broadcasting network 10 and the MPD file of the communication network 20, and reproduces the same. The reproducer 270 may provide a continuous media service by reproducing the consecutive media segments without a need to know the receiving path of the media segment.

Figure 4:
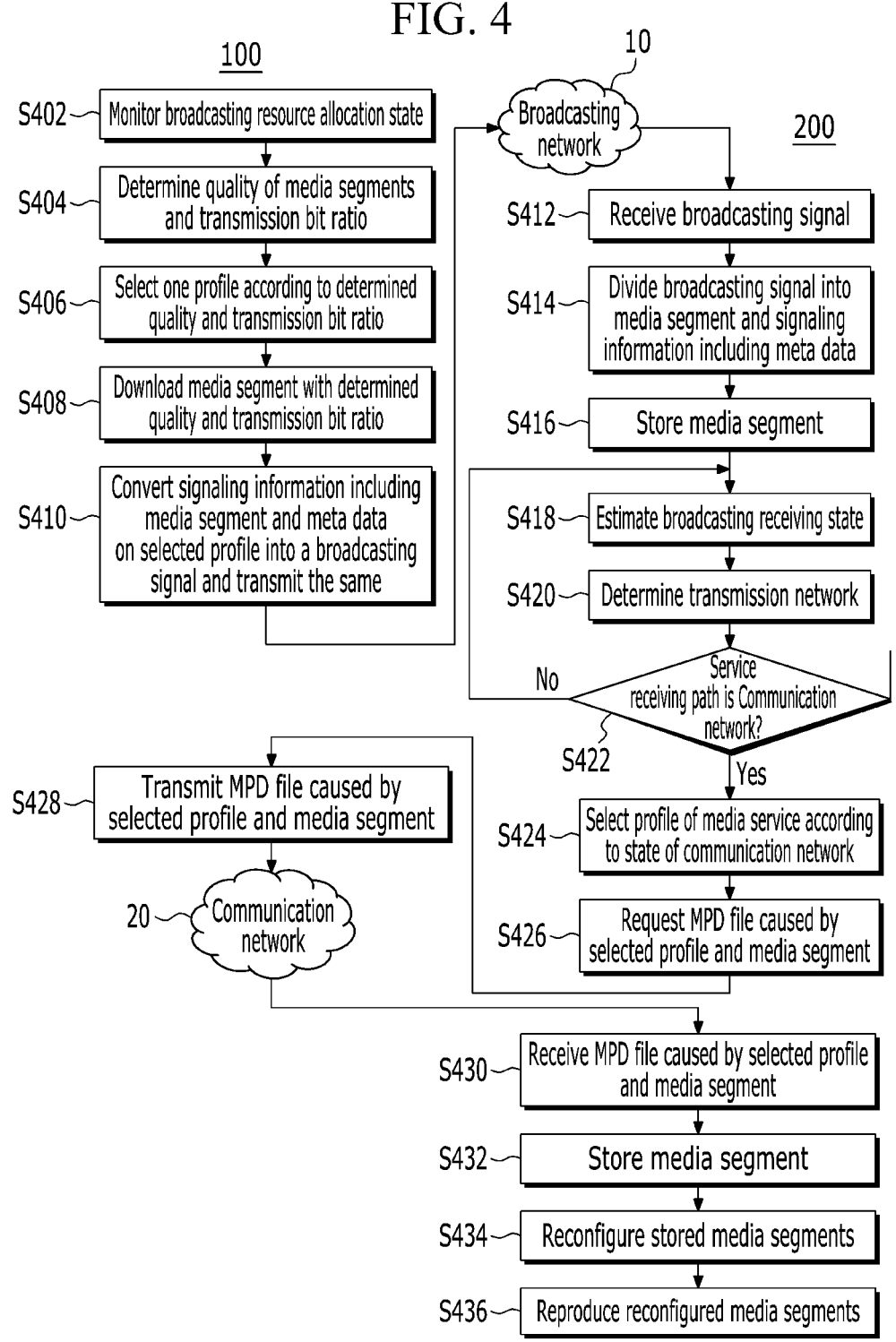
FIG. 4 shows a flowchart of a method for transmitting/receiving a media service according to an exemplary embodiment of the present invention.

FIG. 4 shows a flowchart of a method for transmitting/receiving a media service according to an exemplary embodiment of the present invention.

The device 100 for transmitting a media service monitors the broadcasting resource allocation state (S402), and determines quality of media segments and the transmission bit ratio based upon the broadcasting resource allocation state (S404).

The device 100 for transmitting a media service selects a profile according to the quality and the transmission bit ratio on a plurality of profiles determined from the MPD file (S406), and requests a media segment with the determined quality and transmission bit ratio from the streaming server 120 and downloads the same (S408).

The device 100 for transmitting a media service converts signaling information including the downloaded media segment and the metadata generated by converting part of information on the MPD file of the selected profile into a broadcasting signal, and transmits the same to the device 200 for receiving a media service (S410). When receiving dynamic broadcasting scheduling information from the broadcasting station company, the device 100 for transmitting a media service may convert dynamic broadcasting scheduling information into a broadcasting signal together with information for reproducing media segments, and may transmit the same to the device 200 for receiving a media service.

The device 200 for receiving a media service receives the broadcasting signal from the device 100 for transmitting a media service through a broadcasting network (S412).

The device 200 for receiving a media service processes the broadcasting signal to divide the same into a media segment and signaling information including metadata for decoding the media segment and reproducing the same (S414). When the broadcasting signal includes dynamic broadcasting scheduling information, the device 200 for receiving a media service separates dynamic broadcasting scheduling information from the broadcasting signal.

The device 200 for receiving a media service stores the media segment received through the broadcasting network 10 in the file cache 240 (S416).

The device 200 for receiving a media service estimates the broadcasting receiving state from the broadcasting signal (S418).

The device 200 for receiving a media service determine the transmission network based on the broadcasting receiving state or dynamic broadcasting scheduling information (S420), and selects a service receiving path according to the determined transmission network.

The device 200 for receiving a media service accesses the streaming server 120 when selecting the communication network 20 for the service receiving path (S422).

The device 200 for receiving a media service selects a profile of the media service according to the state of the communication network 20 (S424), and requests the MPD file caused by the selected profile and the media segment from the streaming server 120 (S426).

The streaming server 120 transmits the MPD file caused by the profile requested by the device 200 for receiving a media service and the media segment to the device 200 for receiving a media service (S428).

The device 200 for receiving a media service receives the requested MPD file and the media segment from the streaming server 120 (S430).

The device 200 for receiving a media service stores the media segment received through the communication network 20 in the file cache 240 (S432).

The device 200 for receiving a media service synchronizes the media segments received through the broadcasting network 10 and the communication network 20 and stored in the file cache 240 based upon the metadata received through the broadcasting network 10 and the MPD file received through the communication network 20, and reconfigures the media segments so that they may have temporal continuity based on time order information of the media segments (S434).

The device 200 for receiving a media service decodes the consecutive media segments according to reproduction information and reproduces the same (S436).

According to the exemplary embodiments of the present invention, when the hybrid network including a broadcasting network and a communication network provides a streaming service and the transmission path is changed or the transmission bit ratio is adjusted, continuity of media data is maintained and the stream is easily reconfigured. Further, the segment-based streaming technique is applied to the broadcasting transmitting side and the receiving side to substantially reduce implementation complexity of the system and the service.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A device for transmitting a media service in a hybrid network, which is a combination of a broadcasting network and a communication network, comprising:
   a streaming server for generating media segments including media data and a metadata file including temporal order information and downloading and reproduction information of the media segments corresponding to a plurality of profiles;
   a streaming client for selecting a profile according to a transmission bit ratio appropriate for a broadcasting resource allocation state of the broadcasting network, requesting a media segment with quality that is suitable for the broadcasting resource allocation state from the streaming server, and downloading the same;
   a multiplexer for monitoring the resource allocation state of the broadcasting network, determining the quality and transmission bit ratio appropriate for the broadcasting resource allocation state, and multiplexing part of information of the metadata file on the profile selected from among the media segment and the metadata file of the plurality of profiles to generate a baseband frame; and
   a transmitter for converting the baseband frame into a broadcasting signal and transmitting the same through a broadcasting network.

2. The device of claim 1, wherein the streaming server streams the media segment and the metadata file through the communication network according to a request by a device for receiving a media service.

3. The device of claim 1, wherein the multiplexer multiplexes dynamic broadcasting scheduling information from a server of a broadcasting station company to generate the baseband frame.

4. A device for receiving a media service in a hybrid network that is a combination of a broadcasting network and a communication network, comprising:
   a receiving processor for receiving a broadcasting signal through a broadcasting network, and extracting a baseband frame from the broadcasting signal;
   a demultiplexer for separating a media segment and part of information of a metadata file by demultiplexing the baseband frame;

a streaming client for accessing a streaming server through the communication network, monitoring a state of the communication network, selecting a media segment and a profile with quality that is appropriate for the state of the communication network, requesting a metadata file of the selected profile and the media segment with the quality from the streaming server, and downloading the same from the streaming server when the communication network is determined for the transmission network of the media service;

a synchronizer for reconfiguring the media segments that are received through the broadcasting network and the communication network according to a time order based upon a metadata file caused by the selected profile; and a reproducer for reproducing the reconfigured media segments.

5. The device of claim 4, further comprising a network switching controller for determining the transmission network according to a broadcasting receiving state, wherein the receiving processor estimates the broadcasting receiving state from the broadcasting signal.

6. The device of claim 4, further comprising a network switching controller for determining the transmission network according to dynamic broadcasting scheduling information from a server of a broadcasting station company, wherein the receiving processor receives the dynamic broadcasting scheduling information through the broadcasting signal.

7. The device of claim 4, further comprising a file cache for storing media segments received through the broadcasting network and the communication network.

8. A method for transmitting a media service by a device for transmitting a media service of a hybrid network combined with a broadcasting network and a communication network, comprising:

allowing a streaming server to generate media segments including media data and a metadata file including temporal order information and downloading and reproduction information of the media segments corresponding to a plurality of profiles;

allowing a broadcasting receiving controller to monitor a broadcasting resource allocation state of the broadcasting network;

allowing the broadcasting receiving controller to determine quality and a transmission bit ratio appropriate for the broadcasting resource allocation state;

allowing the broadcasting receiving controller to select a metadata file on a profile that is appropriate for the transmission bit ratio suitable;

allowing the broadcasting receiving controller to request a media segment with quality that is appropriate for the broadcasting resource allocation state from the streaming server, and download the same;

converting the media segment and part of information of the metadata file on the profile into a broadcasting signal, and transmitting the same through a broadcasting network; and allowing the streaming server to stream the media segment and the metadata file through the communication network according to a request by a device for receiving a media service, wherein the broadcasting network is a non local area network (LAN).

9. The method of claim 8, further comprising transmitting dynamic broadcasting scheduling information from a server of a broadcasting station company through the broadcasting network.

10. The method of claim 8, wherein the part of information includes information for decoding and reproducing the media segment.

11. A method for a device for receiving a media service of a hybrid network combined with a broadcasting network and a communication network to receive a media service, comprising:

separating a media segment and part of information of a metadata file from a broadcasting signal received through a broadcasting network;

determining a transmission network of the media service;

when the communication network is determined for the transmission network, monitoring a state of the communication network;

selecting a media segment with quality that is appropriate for the state of the communication network and a profile of the media service;

requesting the selected media segment with quality and the selected metadata file of the profile from the streaming server, and receiving the same from the streaming server through the communication network;

reconfiguring the media segments received through the broadcasting network and the communication network according to a time order based upon the metadata file; and reproducing the reconfigured media segments.

12. The method of claim 11, wherein the determination includes:

monitoring a broadcasting receiving state from the broadcasting signal; and determining the transmission network as the broadcasting network or the communication network based upon the broadcasting receiving state.

13. The method of claim 11, wherein the determining includes:

receiving dynamic broadcasting scheduling information from a server of a broadcasting station company; and determining the transmission network as the broadcasting network or the communication network based upon the dynamic broadcasting scheduling information.

14. The method of claim 11, wherein the reproduction includes reproducing the reconfigured media segments based upon the part of information and the metadata file.

15. The method of claim 11, wherein the part of information includes information for decoding and reproducing the media segment.

* * * * *